United States Patent
Bard et al.

(10) Patent No.: US 6,717,681 B1
(45) Date of Patent: Apr. 6, 2004

(54) PORTABLE REAL-TIME HIGH-RESOLUTION DIGITAL PHASE-STEPPING SHEAROGRAPHY WITH INTEGRATED EXCITATION MECHANISMS

(76) Inventors: Benjamin A. Bard, 19 Benjamin Rd., Belmont, MA (US) 02478; Guowen Lu, 1161 Donington Dr., San Jose, CA (US) 95129-4060; Shudong Wu, 388545 Bell St., Apt. 102, Fremont, CA (US) 94115-3317; John W. Newman, 27 Paper Mill Rd., Newtown Square, PA (US) 19073

( * ) Notice: Subject to any disclaimer, the term of this patent is extended or adjusted under 35 U.S.C. 154(b) by 0 days.

(21) Appl. No.: 09/537,862

(22) Filed: Mar. 28, 2000

Related U.S. Application Data

(60) Provisional application No. 60/127,229, filed on Mar. 31, 1999.

(51) Int. Cl.⁷ ................................................ G01B 9/02
(52) U.S. Cl. ........................................ 356/520; 356/35.5
(58) Field of Search .............................. 356/35.5, 457, 356/458, 520

(56) References Cited

U.S. PATENT DOCUMENTS

| | | | | |
|---|---|---|---|---|
| 5,481,356 A | * | 1/1996 | Pouet et al. | 356/35.5 |
| 6,043,870 A | * | 3/2000 | Chen | 356/35.5 |

OTHER PUBLICATIONS

Martinez–Celorio et al, Extension of the displacement measurement range for ESSPI using carrier fringes and a temporal–phase–unrapping method, SPIE, 751–757.*

Siew–Lok Toh et al, "Using shearography to find the flaws", Mechanical Engineering, Feb. 1999, pp. 62–63.

S. Nakadate et al, "Fringe scanning speckle–pattern interferometry", Applied Optics, v. 24, No. 14 (1985), pp. 2172–2180.

Y. Y. Hung et al, "Measurement of Slopes of Structural Deflections by Speckle–shearing Interferometry", Exp. Mech. 1974.

J. A. Leendertz et al, "An image–shearing speckle–pattern interferometer etc.", J. Phys. E., 1973, pp. 1107–1110.

* cited by examiner

*Primary Examiner*—Samuel A. Turner
(74) *Attorney, Agent, or Firm*—William H. Eilberg

(57) ABSTRACT

A portable nondestructive testing instrument uses high-speed phase-stepping shearography, and vacuum stressing, to produce images of disbonds, impact damage, or delaminations, in metal or composite structures. The invention is especially useful in the inspection of large areas where only external access is feasible, such as in large aircraft, space vehicles, boats, or civil engineered structures having multiple bond lines. The invention includes a novel combination of components and techniques, including a high-spatial-resolution CCD sensor, low-voltage piezoceramic phase stepping, rapid phase stepping, a fast phase calculation technique, a fast image smoothing technique, and an implementation of all of the above in a portable unit. Specially designed timing and control algorithms allow data acquisition, transfer, calculation, smoothing, and display at rates of up to two times per second. The invention also includes the above-described combination, in conjunction with three excitation mechanisms provided in an integrated portable package.

17 Claims, 7 Drawing Sheets

SCHEMATIC OF PHASE-STEPPING SHEAROGRAPHY HEAD
(SHEAROGRAPHY HEAD IS PORTION ENCLOSED BY BOX).

A = COHERENT LASER SOURCE.
B = ADJUSTABLE OPTICAL FIBER COUPLER.
C = ARMORED SINGLE-MODE OR POLARIZATION MAINTAINING (PM) OPTICAL FIBER.
D = DIVERGING OPTICS.
E = CCD CAMERA (ANALOG OR DIGITAL).
F = IMAGING LENS (SIMPLE OR COMPLEX).
G = NONPOLARIZING BEAMSPLITTER CUBE.
H = FRONT SILVERED MIRROR.
I = ADJUSTABLE KINEMATIC MOUNT FOR H.
J = FRONT SILVERED MIRROR.
K = PZT DISK (LOW OR HIGH VOLTAGE VARIETY).

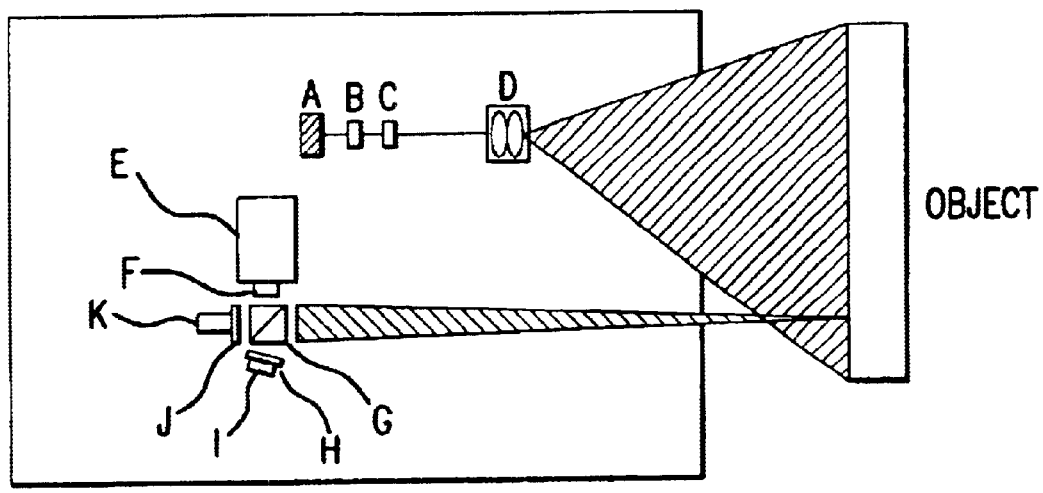

SCHEMATIC OF PHASE-STEPPING SHEAROGRAPHY HEAD WITH LASER DIODE SOURCE (SHEAROGRAPHY HEAD IS PORTION ENCLOSED BY BOX).

A = COHERENT LASER DIODE SOURCE.
B = BEAM SOURCE OPTICS.
C = COLUMATING OPTICS.
D = DIVERGING OPTICS.
E = CCD CAMERA (ANALOG OR DIGITAL).
F = IMAGING LENS (SIMPLE OR COMPLEX).
G = NONPOLARIZING BEAMSPLITTER CUBE.
H = FRONT SILVERED MIRROR.
I = ADJUSTABLE KINEMATIC MOUNT FOR H.
J = FRONT SILVERED MIRROR.
K = PZT DISK (LOW OR HIGH VOLTAGE VARIETY).

FIG.2

SIDE VIEW OF ENCLOSURE (SUBSYSTEM II) WITH SHEAROGRAPHY HEAD (SUBSYSTEM I) MOUNTED ON TOP.

A = METAL ENCLOSURE.
B = SHEAROGRAPHY HEAD.
C = SMALL MIRROR (PREFERABLY FRONT-SILVERED BUT NOT REQUIRED).
D = BIG MIRROR ( PREFERABLY FRONT-SILVERED BUT NOT REQUIRED).
E = GLASS, LUCITE, OR PLEXIGLASS WINDOW.
F = RUBBER FLAPS.
G = STABILIZING FEET.

FRONT VIEW OF SHEAROGRAPHY ENCLOSURE WITH INTEGRATED EXCITATION MECHANISMS.

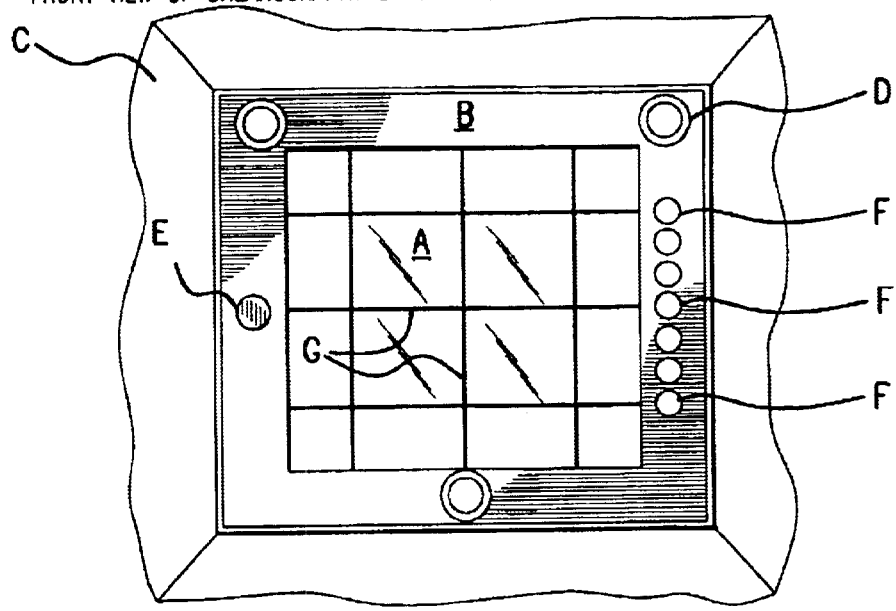

A = GLASS/PLASTIC WINDOW.
B = METAL FRAME OF ENCLOSURE.
C = RUBBER FLAPS.
D = PLASTIC STABILIZING FEET.
E = PLUNGER ATTACHED TO SHAKER/STINGER.
F = HOLES FOR VACUUM.
G = GRID OF HEATING WIRES.

FIG.4

BOTTOM VIEW OF SHEAROGRAPHY WITH INTEGRATED EXCITATION MECHANISMS.

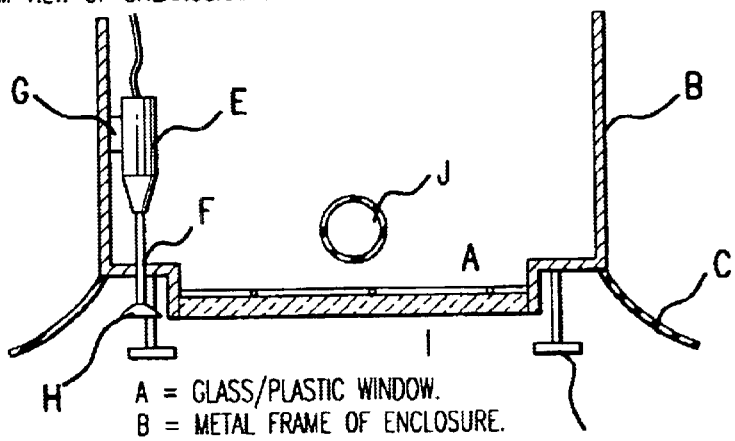

A = GLASS/PLASTIC WINDOW.
B = METAL FRAME OF ENCLOSURE.
C = RUBBER FLAPS.
D = PLASTIC STABILIZING FEET.
E = SHAKER.
F = STINGER.
G = SHAKER MOUNTING.
H = PLUNGER ATTACHED TO SHAKER/STINGER.
I = GRID HEATING WIRES.
J = OUTLET FOR VACUUM HOSE TO BE ATTACHED TO UNDERSIDE OF ENCLOSURE. (VACUUM HOLES CAN NOT BE SEEN IN THIS PERSPECTIVE.)

FIG.5

PHASE MAP OF THERMALLY DEFORMED HONEYCOMB STRUCTURE, WITH NO SMOOTHING.

PHASE MAP OF THERMALLY DEFORMED HONEYCOMB STRUCTURE, WITH NONLINEAR SMOOTHING.

PROTOTYPE PORTABLE REAL TIME HIGH RESOLUTION DIGITAL PHASE STEPPING SHEAROGRAPHY SYSTEM

PORTABLE SHEAROGRAPHY HEAD (INCLUDES OPTICAL SYSTEM AND VACUUM EXCITATION) IN USE

PORTABLE REAL-TIME HIGH-RESOLUTION DIGITAL PHASE-STEPPING SHEAROGRAPHY WITH INTEGRATED EXCITATION MECHANISMS

CROSS-REFERENCE TO PRIOR PROVISIONAL APPLICATION

This application corresponds to U.S. Provisional Patent Application Serial No. 60/127,229, filed Mar. 31, 1999.

BACKGROUND OF THE INVENTION

The present invention relates to the field of nondestructive testing, and, in particular, to the field of speckle-shearing interferometry, or shearography.

Nondestructive testing of aircraft structures, such as honeycombs, has been performed by techniques which include tap testing (i.e. using an inspector's ear to judge the presence of a skin-to-core disbond), impedance bond testing, and pulsed-echo ultrasonics. While effective, these prior art methods are either subjective, require considerable recalibration with changes in skin thickness, provide subjective interpretation, or are slow. Shearography has been found to be a more preferred method of nondestructive testing.

Shearography was first introduced by Hung and Taylor, in "Measurement of slopes of structural deflections by speckle-shearing interferometry", Experimental Mechanics, vol. 14, pages 281–285 (1974), and by Leendertz and Butters, in "An image-shearing speckle-pattern interferometer for measuring bending moments", J. Phys. E.: Sci. Instrum., vol. 6, pages 1107–1110 (1973). Shearography essentially comprises the formation of an image comprising two laterally-displaced images of the same object.

Shearography is a full-field optical speckle interferometric procedure which is capable of measuring small deformations of a surface. These deformations can be produced by several mechanisms, and are measured for several purposes. Deformation mechanisms include, among others, vacuum, pressure, microwave, thermal, vibration, and ultrasonic excitation. Purposes for measurement include stress analysis, vibration measurement, acoustic and elastic wave visualization, and other non-destructive testing (NDT) including detection of flaws in a test object.

The first practical apparatus for performing shearography electronically was introduced in 1987, and was based on the technology described in U.S. Pat. No. 4,887,899, the disclosure of which is incorporated by reference herein. The form of shearography described in the above-cited patent, using birefringent optics as a means of generating a sheared image, provided the first high-resolution, real-time shearography system which could produce images of disbonds due to out-of-plane deformations caused by vacuum stress of the skin of the structure being tested.

The first portable vacuum stress shearography instruments used video subtraction to provide rapid imaging of flaws. While this technology was a major advance in nondestructive testing, enabling one to perform tests at a rate of 150 square feet per hour, as compared with 3–8 square feet per hour using prior methods, the sensitivity of the technology to defects was limited. Subtraction shearography provides images of flaws only when the out-of-plane deformation exceeds one-half wavelength in the shear offset distance, the distance between the sheared images. The portable subtraction shearography devices of the prior art have found important uses in the aerospace field, in the inspection of composite honeycomb structures including radomes, composite fuselages, wheel doors, close-out panels, and many other components.

Portable vacuum stress shearography cameras are subject to several types of vibration, noise, and mechanical instabilities that considerably degrade the image quality and the ability to detect defects in aerospace structures. Not only do these sources of noise have to be eliminated with techniques that do not add weight and size to the portable instrument, but any method used to increase sensitivity must be made to run as fast as possible to prevent degradation of the images.

One method of increasing defect sensitivity is the use of phase-stepping shearography, introduced by Nakadate in 1985. While Nakadate demonstrated the use of phase-stepping and the increased defect sensitivity provided by phase map presentations, the software and hardware available at that time required ten minutes to yield the phase map image, far too slow for use in a practical nondestructive testing instrument. In addition, the phase step process requires capturing consecutive video frames and considerable arithmetic manipulation of between four and ten images to calculate the phase map. The level of noise rapidly increases as the time to perform the calculations increases, dramatically reducing sensitivity.

A basic setup of an electronic shearography system is as follows. Coherent laser light is spread out to illuminate a portion of the object's surface, e.g. one square foot. The light reflects from the surface, passes through an optical shearing mechanism, and then enters a CCD camera. The surface is then deformed by one of the aforementioned mechanisms, such as heat. As the surface expands slightly due to the applied heat, the deformation of the surface is viewed, in real time, on a video monitor. This deformation is usually not visible to the eye because it is on the order of the wavelength of the laser light being used, i.e. approximately 250 nm. Deformation of the surface often shows direct evidence of a subsurface flaw.

Shearography has evolved over the years from a film-based to a video-based (electronic, or analog) system, and finally to systems which store the images in a computer, in digital form. In its film-based form, shearography is typically limited to an optics laboratory. In its electronic or digital form, if the system is made compact, shearography can be removed from the laboratory, and used in real-world settings. It can survive environmental factors such as slight heat and vibration fluctuations due to its particular optical setup.

As implied above, there are two fundamental modes in which shearography can be used, namely, speckle correlation fringe formation due to subtraction, and phase map formation due to phase stepping. As already noted, phase stepping is beneficial since it results in increased signal-to-noise ratio (SNR), increased displacement resolution (resulting in increased flaw detection sensitivity), quantitative rather than qualitative results, and other factors. Either of the two modes (fringes or phase stepping) can be used with either of the three bases (film, electronic, digital), creating six combinations. Then there are more than seven known optical shearing mechanisms, and more than six known phase-stepping methods. The number of possible system implementations is hence quite high. Furthermore, the phase-stepping algorithm, of which there are at least ten, the computational method of implementing the algorithm, and the consequent speed with which the algorithm is executed are all important. These directly affect the accuracy and SNR of the final measurements as well as the rate at which a user can view the results and make slight changes.

Finally, the entire optical system is either used as a research tool in an optics laboratory on a vibration-isolation table, or it must be packaged such that it can be taken into the field and used with several excitation mechanisms in order to find flaws effectively, efficiently, and conveniently.

The present invention provides a high-speed phase-stepping shearography system which requires less than about one second to produce an image, and which demonstrates remarkable stability, sensitivity, and image quality. Compared to the prior art, the present invention improves defect sensitivity by a factor of 50, enabling a portable shearography system to compete with widely-accepted ultrasonic systems, but at a speed of operation which is about 50 times faster.

SUMMARY OF THE INVENTION

The system of the present invention includes four subsystems, namely a shearography head, an enclosure, an excitation mechanism, and a computational subsystem. The shearography head preferably uses a Michelson interferometer to generate the sheared images, and can receive laser light either from an external laser, coupled by an optical fiber, or from a laser diode which is internal to the head. The amount of phase stepping is automatically adjusted by moving one of the mirrors of the Michelson interferometer, through the use of a piezoceramic disk which is controlled by a voltage determined by a computer. The amount of shearing is adjusted by manually tilting a different mirror in the Michelson interferometer.

The enclosure includes, at a minimum, a casing having a transparent window to permit laser illumination and formation of an image of the test object. In a preferred embodiment, the shearography head is mounted on the enclosure, the enclosure having a hole which cooperates with a similar hole in the shearography head, such that laser light can pass from the head, to the object, and back into the head, through the cooperation of various mirrors. The enclosure also includes means for stabilizing the system relative to the object being tested.

The excitation mechanism can be a vacuum, or it can be a thermal or vibration system. In the preferred embodiment, all three excitation mechanisms (vacuum, thermal, and vibration) are built into the same enclosure, so that any or all of these mechanisms can be used without modifying the apparatus. The preferred source of the vacuum is an external blower which is connected, through suitable holes in the enclosure, to the interior of the enclosure. The preferred source of thermal excitation is a grid of thin heated wires disposed near the transparent window of the enclosure, so as to be in a position to heat the test object. The preferred source of vibrational excitation includes a shaker/stinger/plunger arrangement which is built into the enclosure.

The computational subsystem includes a programmed computer which is connected, through appropriate analog-to-digital and digital-to-analog converters, to the components described above. In the preferred embodiment, the computer directs a four-step algorithm which captures and stores images of the test object at four different positions of the mirror, when the object is both in the deformed and undeformed states. Comparison of the stored images, coupled with application of a smoothing algorithm, yields a pattern that can be viewed, essentially in real time, on a video display.

The present invention therefore has the primary object of providing an apparatus for performing real-time digital shearography.

The invention has the further object of providing the benefits of the phase-stepping technique in real-time digital shearography for increased sensitivity and signal-to-noise ratio as well as quantitative rather than qualitative data.

The invention has the further object of providing real-time shearography, using a portable unit.

The invention has the further object of providing a shearography system which produces a high-resolution image in real time, and which can conveniently be used in commercial or industrial environments.

The invention has the further object of providing an integrated, compact digital shearography system, wherein a plurality of mechanisms for excitation are present in a single housing.

The invention has the further object of enhancing the efficiency of nondestructive testing of objects.

The invention has the further object of making it easier to search for defects in structures where interior access is difficult or impractical, such as in aircraft, space vehicles, boats, and civil-engineered structures.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 2 provides a schematic diagram of a second embodiment of the shearography head used in the present invention.

FIG. 4 provides a front view of the enclosure of the present invention, showing components used in generating three different types of excitation.

FIG. 5 provides a bottom view of the enclosure of the present invention, showing other views of the components used in generating the three different types of excitation shown in FIG. 4.

DETAILED DESCRIPTION OF THE INVENTION

The present invention comprises four subsystems, namely, a shearography head, an enclosure, an excitation mechanism, and a computational subsystem. One embodiment of the invention is in a single portable hand-held unit, where the head and excitation mechanisms are integrated with the enclosure which is held by the user. The head/enclosure/excitation unit is attached to the computational subsystem. Two slightly different optical setups for the shearography head can be used in this embodiment. A second embodiment of the invention has the head inside the enclosure and mountable on a tripod; for this embodiment, the enclosure is simplified and excitation mechanisms are applied externally and are not integrated into the enclosure. Either optical setup for the shearography head can also be used with this second embodiment. All described combinations of optical setups and enclosures result in real-time high-resolution portable digital phase-stepping shearography. Two particular combinations result in real-time high-resolution portable digital phase-stepping shearography with integrated vacuum, thermal, and vibration excitation mechanisms.

Figure 1:
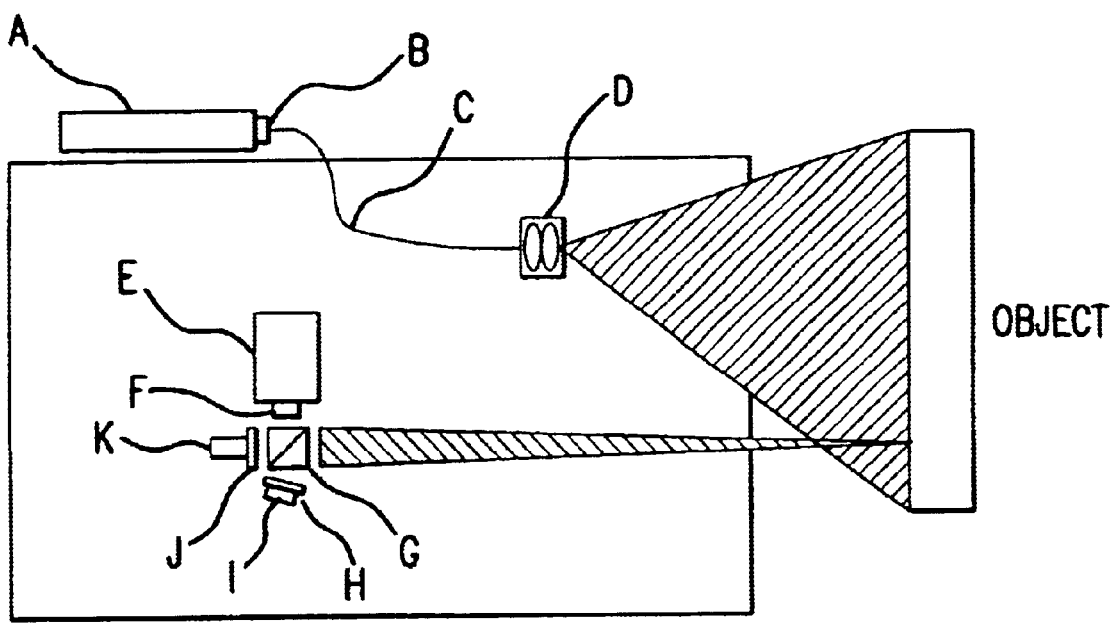
FIG. 1 provides a schematic diagram of a first embodiment of the shearography head used in the present invention.

The shearography head is shown in FIGS. 1 and 2. FIG. 1 shows an embodiment wherein laser light is generated externally of the head, and conveyed into the head by an optical fiber. FIG. 2 shows an embodiment wherein the laser source is a laser diode within the head. In both FIG. 1 and FIG. 2, the shearography head is the portion enclosed by the box.

In the embodiment of FIG. 1, laser light from coherent laser source A is connected to armored single-mode or polarization-maintaining (PM) optical fiber C, through adjustable optical fiber coupler B. Laser light from the fiber passes through diverging optics D and illuminates the test object. In the case of a hand-held unit, approximately one square foot of the object's surface is illuminated. In the case of a tripod-mounted embodiment, up to ten square feet can be illuminated, depending on available coherent laser power. Either the hand-held or tripod embodiment can be used with either of the embodiments of FIGS. 1 and 2.

The diverging optics can consist of several elements, but need at least a simple lens to focus and then diverge the light. Other elements can consist of custom-made or off-the-shelf anti-Gaussian lenses to distribute uniformly the illuminating laser light on the surface of the object.

Reflected light passes through an optical shearing mechanism. This mechanism can be one of many, but to meet the requirements of this invention, the mechanism selected is a modified Michelson interferometer. The Michelson interferometer includes two front-silvered mirrors J and H, and a nonpolarizing beam splitter cube G. Modification of the interferometer comes from the fact that one of the two mirrors is intentionally misaligned due to tilting. This tilting can be adjusted, resulting in adjustable shearing direction and magnitude, by mounting the mirror on an adjustable kinematic mirror mount I. A further modification is made to allow phase-stepping to take place.

The second mirror J is mounted to a piezoceramic (PZT) disk K, which is attached via two electrical leads to a voltage source. The PZT disk can require an external voltage amplifier, or be of a low-voltage variety for convenience; the latter was chosen in this implementation to promote portability.

Reflected light finally is imaged by a CCD camera E with attached imaging lens F. The imaging lens is chosen based on the field of view to be imaged, as well as the acceptable amount of transverse distortion. The CCD camera is chosen based on light sensitivity, noise characteristics, spatial resolution, and data throughput. Analog or digital CCD cameras can be used. In this implementation, a high resolution (1024×1024 cell) digital CCD camera was used, but higher resolution devices can also be used if data throughput is acceptable. This particular camera operates in "progressive line-scan mode", allowing efficient digitization and transfer of data.

In the embodiment of FIG. 2, the laser light is produced by laser diode A. Light from diode A passes through beam shaping optics B and collimating optics C, before reaching diverging optics D. Elements E, F, G, H, I, J, and K are the same as in the embodiment of FIG. 1.

The second subsystem of the present invention is the portable enclosure that houses the shearography head. In the embodiment where the enclosure is mounted on a tripod and excitation mechanisms are not integrated, the enclosure is simply a metal casing with a glass window for the laser illumination and camera imaging. The casing will also allow controls for camera focusing and aperture, as well as adjustable shearing (via the kinematic mount I of FIGS. 1 and 2), to protrude for adjustment by the user. In the embodiment wherein the enclosure is held by the user and contains integrated excitation mechanisms, the enclosure will be as illustrated in FIG. 3.

Figure 3:
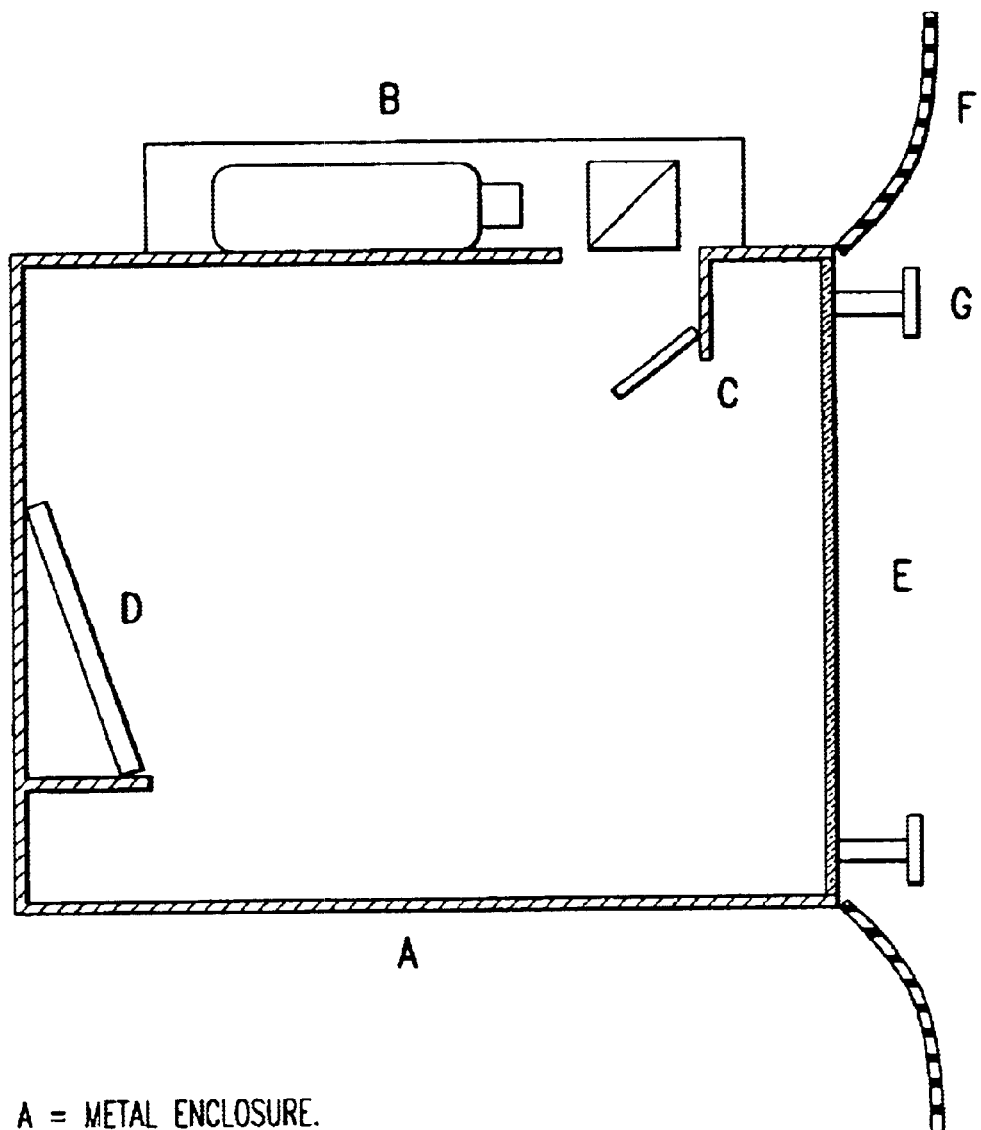
FIG. 3 provides a side view of the enclosure used in the present invention, showing the shearography head, in schematic form, mounted on top of the enclosure.

FIG. 3 shows a side view of the enclosure A with the shearography head mounted on top of it. Images of the surface of a test object are captured by laser light which is fed from the shearography head B, down through a hole in the enclosure, reflected from mirror C and again from mirror D, and passed through window E, which may be made of glass or plastic. The laser light is reflected off of the surface of the object (not shown in FIG. 3), and enters the enclosure by passing again through window E. The light is then further reflected by mirrors D and C, and returns to shearography head B, where it enters the camera/lens/shearing combination. Stabilizing feet G will rock about a ball joint (not shown), allowing the unit to be pushed against the surface being measured while protecting the window E. Flaps F both keep out stray ambient light and also help to create a vacuum hold, described later.

In the case of a smaller camera and laser diode source, all components can be contained inside the enclosure itself and do not need to be mounted on top of the enclosure. In the latter case, there will be no hole on the top of the enclosure, and at least one of the two internal mirrors can be omitted.

The third subsystem of the present invention comprises the excitation mechanism. Several excitation mechanisms can be used either independently or in combinations. Sources of these excitation mechanisms can be built into the enclosure to allow convenient application at a touch of a switch. This concept is illustrated in FIGS. 4 and 5.

The three excitation mechanisms are 1) vacuum, 2) thermal, and 3) vibration. Vacuum is used in all cases, where tripod mounting is not used, to hold the shearography head and the enclosure firmly to the object, but is not varied during the data acquisition period when used only for this purpose. When used as such, vacuum is not considered an excitation mechanism but an integral part of the measurement procedure.

Vacuum can also be increased slowly during the data acquisition period to become an excitation source itself. The vacuum is applied by means of an external vacuum blower which reduces the pressure in a flexible rubber tube connected to the bottom of the enclosure. The path of the vacuum is routed through the enclosure and then through several holes in the glass or plastic window, evacuating the air lying between the window/flaps and the object's surface. This arrangement causes the surface of the object lying just under the window to be pulled toward the window.

Thermal excitation is performed by a grid of thin, heated wires lying between the outside surface of the glass/plastic window and the leveling feet. The wires heat up at a flip of a switch, and the surface of the test object thermally deforms. The wires are thin and will be barely resolved by the imaging system. Furthermore, due to subtraction algorithms, to be described later, most visual traces of the wires will be removed computationally.

Vibration excitation is performed by a shaker/stinger/plunger arrangement exiting the enclosure housing. The shaker is mounted inside the enclosure on a vibration isolation (dissipative) mounting, and the attached stinger passes through a hole in the frame of the enclosure. The end of the stinger has an attached rubber plunger which makes contact with the surface of the test object. When the shaker is snapped into place, pushing the enclosure against the test object will also engage the stinger/plunger. When the shaker is not snapped into place, the plunger does not make contact with the surface, allowing other excitation methods to be used.

FIG. 4 provides a front view of the enclosure with integrated excitation mechanisms. The figure shows glass or plastic window A, mounted within metal frame B of the enclosure. Rubber flaps C function as described above, namely to keep out stray light, and to enhance the vacuum hold. Stabilizing feet D are preferably made of plastic. Plunger E is attached to the shaker/stinger (not shown in FIG. 4). Holes F permit a vacuum to be applied. Heating wires G provide the desired thermal excitation.

FIG. 5 provides a bottom view of the enclosure of FIG. 4. As in FIG. 4, window A is shown mounted within frame B of the enclosure. The figure shows rubber flaps C and plastic stabilizing feet D. The figure also shows shaker E, stinger F, and shaker mounting G. Plunger H is attached to the shaker/stinger. The grid of heating wires is shown as element I. Outlet J provides means for attaching a vacuum hose to the underside of the enclosure.

The fourth subsystem of the present invention comprises the computational algorithms for control, calculation, and display. Operation of the components within the shearography head is controlled by a host computer. The computer sends calibrated voltages at specific times to the PZT disk, sends signals to the camera to begin grabbing frames, receives data from the camera as images are captured, and can trigger excitation mechanisms to begin and end. Alternatively, the latter step can be performed manually. Timing and data throughput are crucial to the success of the data acquisition. After data is acquired, rapid data processing and display must be accomplished.

Several phase-stepping algorithms can be implemented, including 2-step, 3-step, 4-step, and 5-step methods. The 4-step algorithm will be illustrated, but the general procedure is the same for any of them.

The following steps occur in rapid succession:

1. The camera is triggered to capture one frame of the surface and send the data to the computer.
2. While the camera is between two successive video frames, a signal is sent to the PZT which causes the attached mirror to be translated by a calibrated distance.
3. Once the mirror has finished its travel, the camera is triggered to capture a second frame and send data to the computer.
4. A second signal is sent to the PZT to translate the mirror.
5. The camera is triggered and a third frame is captured.
6. A third signal is sent to the PZT.
7. The camera is triggered and a fourth frame is captured.
8. The optical phase for the first "object state" is calculated and stored.
9. A signal is sent to the PZT to return the mirror to its initial position.
10. The object is deformed, either manually or automatically, using one or a combination of excitation methods.
11. Once deformation is stopped, or is varying slowly, steps 1 through 7 are repeated.
12. The optical phase for the second "object state" is calculated, subtracted from the phase for the first object state, and the difference is rectified, converted to 256 values, and displayed on the screen as a gray scale image.

The phase calculation occurs at each pixel over all the images. For the four-step method, the equation is:

$$\Delta(x, y) = \tan^{-1}\left[\frac{I_8(x, y) - I_6(x, y)}{I_5(x, y) - I_7(x, y)}\right] - \tan^{-1}\left[\frac{I_4(x, y) - I_2(x, y)}{I_1(x, y) - I_3(x, y)}\right]. \quad (1)$$

where $I_1$ through $I_8$ are the eight captured images, described by $$I_1(x,y) = I'(x,y) + I''(x,y)\cos[\phi(x,y)],$$

$$I_2(x,y) = I'(x,y) + I''(x,y)\cos[\phi(x,y) + \pi/2],$$

$$I_3(x,y) = I'(x,y) + I''(x,y)\cos[\phi(x,y) + \pi],$$

$$I_4(x,y) = I'(x,y) + I''(x,y)\cos[\phi(x,y) + 3\pi/2],$$

$$I_5(x,y) = I'(x,y) + I''(x,y)\cos[\phi(x,y) + \Delta(x,y)],$$

$$I_6(x,y) = I'(x,y) + I''(x,y)\cos[\phi(x,y) + \Delta(x,y) + \pi/2],$$

$$I_7(x,y) = I'(x,y) + I''(x,y)\cos[\phi(x,y) + \Delta(x,y) + \pi],$$

$$I_8(x,y) = I'(x,y) + I''(x,y)\cos[\phi(x,y) + \Delta(x,y) + 3\pi/2] \quad (2)$$

Here, I' is the bias intensity, I" the modulation intensity, $\phi$ a random phase variable due to the diffuse reflection of laser light from the surface, and $\Delta$ is a quantity directly proportional to the differential displacement due to deformation. The resulting quantity has positive and negative values so it is rectified and converted to 8-bit (256 values) for gray scale display. It should be noted that speckle correlation fringe production due to subtraction is actually a subset of the above phase calculation equations, and can easily be performed by the same opto-mechanical and computational components.

Figure 6:
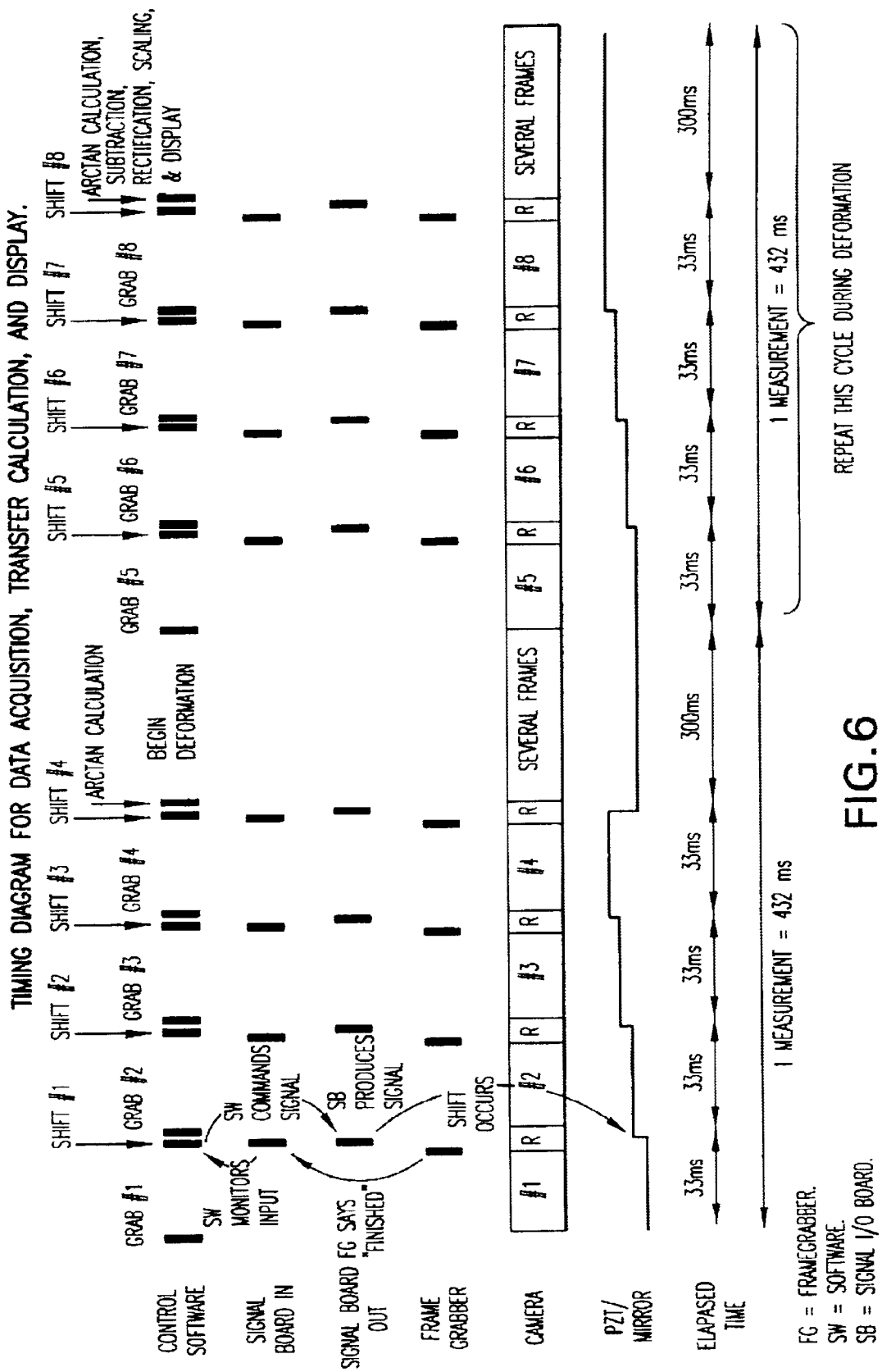
FIG. 6 provides a timing diagram showing the various steps commanded by the computer in performing the method of the present invention, including the acquisition of an image for each of four positions of a mirror, in both the undeformed and deformed states of the test object.

Calculation using Equation (1) can be time consuming. In a report as recent as a February, 1999 article, a calculation of this type was described as taking approximately 10 seconds to calculate one phase map. Several factors allow the current system to accomplish the same task in less than 500 milliseconds. First, the actual data acquisition is rapid, due to the tight control of all the opto-mechanical components and their timed integration due to computer control. The phase shifting, data acquisition, and data transfer to the host computer take 132 milliseconds. Then, calculation of Equation (1) is not performed directly in the host computer's central processing unit (CPU), but uses a look-up table with pre-stored values for the $\tan^{-1}$ function. Calculation and display hence take approximately 300 milliseconds. Since the frame grabber, video random access memory (VRAM), signal generator, and CPU are the fastest available off-theshelf components, and tight integration and control algorithms coupled with the use of look-up tables for phase calculation have been used, the system can hence capture, calculate, and display up to two phase maps per second. Details of this process are shown in FIG. 6, which is a timing diagram showing all events in the phase acquisition, calculation, and display process.

Figure 7:
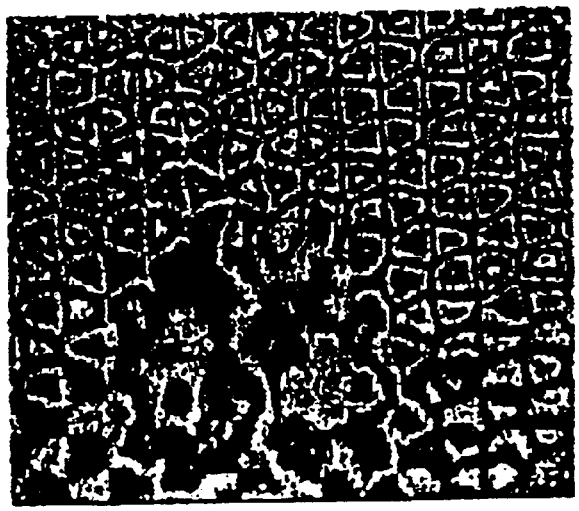
FIG. 7 provides a reproduction of a photograph showing a phase map of a thermally deformed honeycomb structure, produced with the apparatus of the present invention, but having no smoothing.

After calculation, the phase result displayed on the computer monitor or video screen shows deformation of the surface of the test object. An example of such a calculated phase map is shown in FIG. 7.

A further calculation can be performed to smooth the calculated phase for higher quality display and easier visual location of flaws. Typical smoothing algorithms depend on low-pass filters, which are time-consuming. In order not to degrade the real-time display of the phase-stepping system, a "nonlinear filter" is implemented for fast smoothing. Invalid pixels ("noise") are identified by failing any one of three criteria: a pixel has a zero value (null condition), a pixel has the maximum value allowed by the analog to digital converter of the camera (saturation condition), or four pixels (from the same (x,y) position in all four images) have insufficient modulation, where modulation is defined as:

$$M(x, y) = \frac{1}{2}\sqrt{[I_1(x, y) - I_1(x, y)]^2 + [I_4(x, y) - I_2(x, y)]^2} . \quad (3)$$

A threshold value for the modulation test can be found by simple trial and error, as will be apparent to persons skilled in the art.

Figure 8:
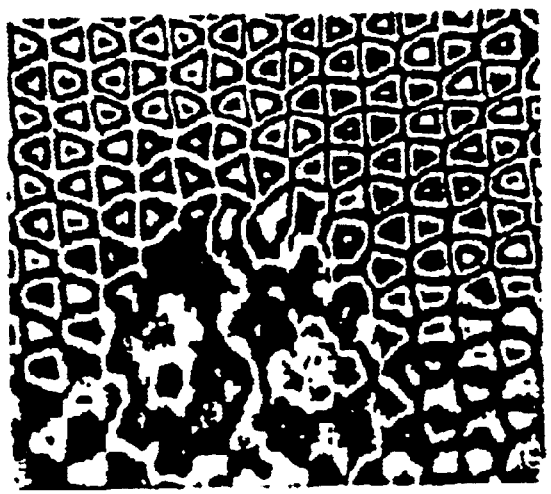
FIG. 8 provides a phase map similar to that of FIG. 7, but including the effect of nonlinear smoothing.

Once invalid pixels are known, they can be replaced by their valid neighbors. Bounds exist on this method in order not to propagate a single valid pixel over the entire image, and these bounds are checked at each invalid pixel being considered. The smoothing process takes approximately 200 milliseconds to cover a 1317 by 1035 pixel image. With nonlinear smoothing, the entire phase measurement and display process takes just over a half second, still allowing almost two smoothed phase maps per second to be displayed on the screen. The smoothed version of FIG. 7 is shown in FIG. 8.

Figure 9:
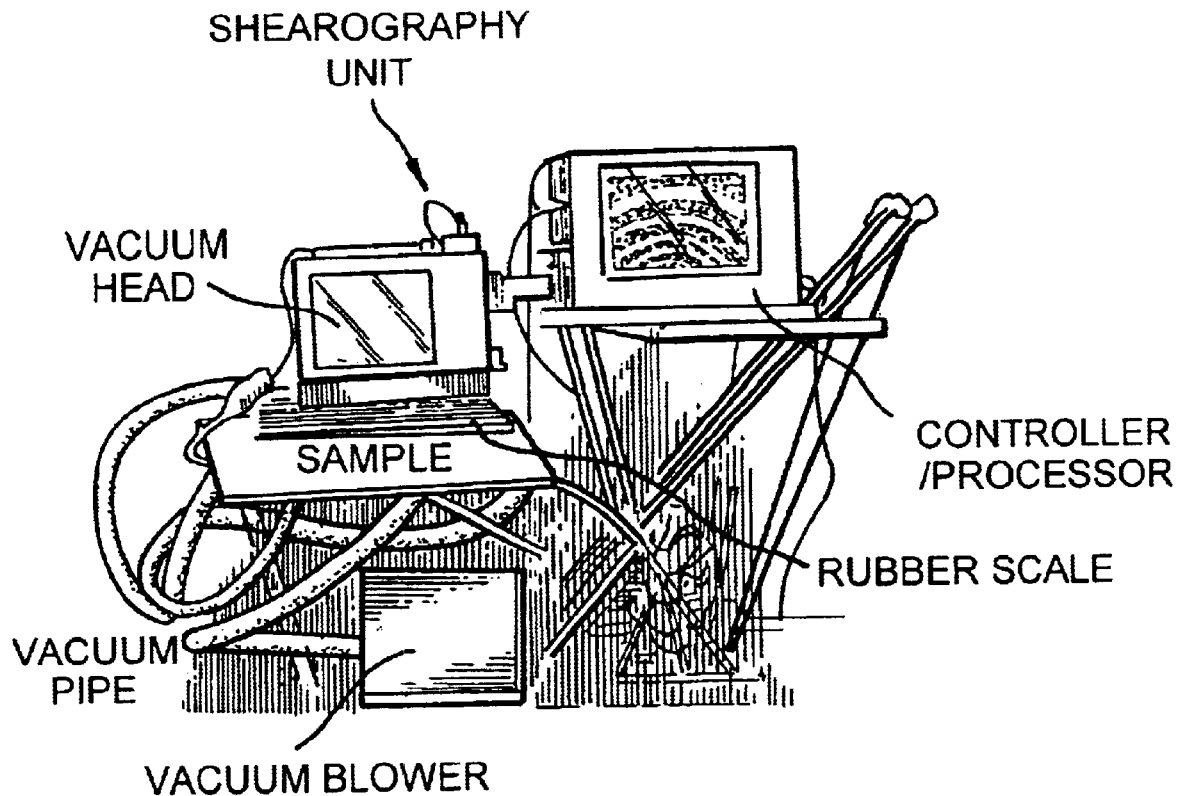
FIG. 9 provides a photograph of a prototype system made according to the present invention.
Figure 10:
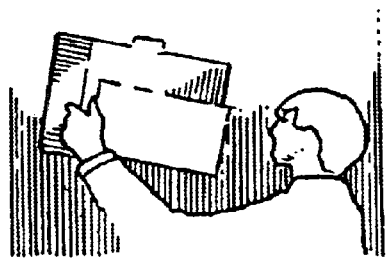
FIG. 10 provides a photograph of a portable shearography unit, made according to the present invention, and being used to examine a test object.

All of the above-described subsystems were built into a prototype system, which is shown in FIG. 9. This prototype contains only vacuum excitation. FIG. 10 shows the vacuum-excitation shearography head being applied to non-destructive testing of aircraft.

As mentioned above, many combinations of optical components, setups, phase-stepping methods, and algorithms exist. The originality of the present invention resides, in part, in the combination of previously-available features never combined before, in addition to the fact that this combination yields a portable system and delivers real-time results to the user. For example, a high-resolution sensor has been combined, in the prior art, with phase-stepping shearography, but the sensor in the latter system was digitized film, which required both a stable optics laboratory and extended time for digitization and calculation. When a high-resolution sensor was combined, in the past, with phase-stepping digital shearography, it was removed from the darkroom, but the wealth of data took up to ten seconds to be transferred, calculated, and displayed on the screen. Fast phase-stepping has been used in the prior art, using look-up tables and integrated timing control, but only in a laboratory setting and with a low resolution sensor. This is the first time that a high-resolution sensor has been incorporated into a digital phase-stepping shearography system that was capable of displaying up to two phase measurements per second. Hence, this sensor, in configuration and capabilities, is unique even when mounted on a tripod and not integrated with a user-held enclosure or excitation mechanisms.

Furthermore, the system of the present invention has been packaged in a user-held enclosure with an integrated vacuum hold, allowing the entire system to be brought into the field and firmly mounted to the object being studied. A similar enclosure has been used with analog subtraction shearography technology, but this is the first time that the portability, convenience, and vacuum holding abilities have been combined with high-resolution real-time digital phase-stepping shearography.

Still further, the present invention provides a novel configuration for integrating thermal and vibration excitation into the portable enclosure. While extremely convenient and effective for flaw detection, this arrangement has not been suggested or realized before. It brings the power of three, rather than one, excitation mechanisms to the aid of portable high-resolution real-time digital phase-stepping shearography.

What is claimed is:

1. A portable real-time high-resolution digital phase-stepped shearography apparatus comprising:
   a) a shearography head including at least one movable mirror and a piezoceramic disk connected to the mirror,
   b) a programmed computer connected to said shearography head, and
   c) a display, connected to the computer,
   wherein the computer is programmed to issue signals to the piezoceramic disk so as to control movements of the mirror, and wherein the computer is programmed to store images of a test object captured by the shearography head, and to analyze said images so as to produce a pattern viewable on the display,
   wherein the shearography head is mounted in an enclosure, and wherein the enclosure also includes at least two distinct excitation mechanisms for causing deformation of a test object.

2. The shearography apparatus of claim 1, wherein the computer comprises means for moving the mirror between successive video frames.

3. The shearography apparatus of claim 2, wherein the computer is programmed to analyze said images while the mirror is not moving, wherein the images are analyzed in real time.

4. A portable real-time high-resolution digital phase-stepped shearography apparatus comprising:
   a) a shearography head including a high-resolution video camera and a Michelson interferometer including at least one movable mirror and a piezoceramic disk connected to the mirror,
   b) the shearography head being connected to a housing, wherein the housing supports at least one excitation mechanism,
   c) a programmed computer connected to said shearography head, and
   d) a display, connected to the computer,
   wherein the computer is programmed to issue signals to the piezoceramic disk so as to control movements of the mirror, and wherein the computer is programmed to store images of a test object captured by the shearography head, and to analyze said images so as to produce a pattern viewable on the display,
   wherein the housing supports at least two distinct excitation mechanisms.

5. The shearography apparatus of claim 4, wherein the computer comprises means for moving the mirror between successive video frames.

6. The shearography apparatus of claim 4, wherein the housing comprises an enclosure having a top, the shearography head being mounted on the top of the enclosure, the enclosure including at least one mirror and a window.

7. The shearography apparatus of claim 6, wherein the enclosure has a hole which cooperates with a second hole in the shearography head, wherein light can pass from the head, to the object, and back into the head.

8. A portable real-time high-resolution digital phase-stepped shearography apparatus comprising:
   a) a shearography head including at least one movable mirror and a high-resolution camera,
   b) a programmed computer connected to said shearography head, and
   c) a display, connected to the computer,
   wherein the computer is programmed to issue signals to control movements of the mirror, and wherein the computer is programmed to store images of a test object captured by the shearography head, and to analyze said images so as to produce a pattern viewable on the display,
   wherein the computer comprises means for moving the mirror between successive video frames,
   wherein the computer is programmed to analyze said images while the mirror is not moving, wherein the images are analyzed in real time,
   wherein the computer comprises means for calculating an optical phase for each portion of each image,
   wherein the computer includes means for calculating optical phases using a lookup table having pre-stored values,
   wherein the computer further comprises means for applying a nonlinear smoothing technique to the calculated phases,
   and wherein the computer includes means for calculating said optical phases and applying the smoothing technique when the mirror is not moving, such that the evaluation and smoothing are performed in real time,
   and wherein the shearography head is connected to a housing, and wherein the housing supports at least two distinct excitation mechanisms.

9. A method of nondestructive testing of an object, comprising:
   a) aiming a portable shearography unit at a test object, the shearography unit including a shearography head and at least two distinct excitation mechanisms, the shearography unit being connected to a computer and a display,
   b) activating the shearography head to acquire images of the test object while the object is in an undeformed state,
   c) selecting one of said at least two excitation mechanisms,
   d) actuating said selected one of said at least two excitation mechanisms, so as to deform the object,
   e) activating the shearography head to acquire images of the test object while the object is in a deformed state,
   f) processing the images acquired in steps (b) and (e) in the computer so as to generate a pattern on the display.

10. The method of claim 9, wherein steps (b) and (e) include stepping the shearography head through a plurality of distinct optical fields, and wherein the stepping is performed between successive images.

11. The method of claim 10, wherein the stepping is performed by transmitting signals to a piezoceramic disk connected to a mirror in the shearography head so as to move the mirror through a predetermined distance.

12. A method of nondestructive testing of an object, comprising:
   a) aiming a portable shearography unit at a test object, the shearography unit including a shearography head and at least two distinct excitation mechanisms, the shearography unit being connected to a computer and a display,
   b) activating the shearography head to acquire images of the test object while the object is in an undeformed state,
   c) selecting two of said at least two excitation mechanisms,
   d) simultaneously actuating both of said selected two of said at least two excitation mechanisms, so as to deform the object,
   e) activating the shearography head to acquire images of the test object while the object is in a deformed state,
   f) processing the images acquired in steps (b) and (e) in the computer so as to generate a pattern on the display.

13. The method of claim 12, wherein steps (b) and (e) include stepping the shearography head through a plurality of distinct optical fields, and wherein the stepping is performed between successive images.

14. The method of claim 13, wherein the stepping is performed by transmitting signals to a piezoceramic disk connected to a mirror in the shearography head so as to move the mirror through a predetermined distance.

15. A method of nondestructive testing of an object, comprising:
   a) aiming a portable shearography unit at a test object, the shearography unit including a shearography head and a plurality of distinct excitation mechanisms, the shearography unit being connected to a computer and a display,
   b) activating the shearography head to acquire images of the test object while the object is in an undeformed state,
   c) selecting a plurality of said excitation mechanisms,
   d) simultaneously actuating said plurality of excitation mechanisms selected in step (c), so as to deform the object,
   e) activating the shearography head to acquire images of the test object while the object is in a deformed state,
   f) processing the images acquired in steps (b) and (e) in the computer so as to generate a pattern on the display.

16. The method of claim 15, wherein steps (b) and (e) include stepping the shearography head through a plurality of distinct optical fields, and wherein the stepping is performed between successive images.

17. The method of claim 16, wherein the stepping is performed by transmitting signals to a piezoceramic disk connected to a mirror in the shearography head so as to move the mirror through a predetermined distance.

* * * * *